United States Patent [19]

Whalen

[11] Patent Number: 4,833,942
[45] Date of Patent: May 30, 1989

[54] MULTISTATE DIFFERENTIAL TRANSMISSION

[76] Inventor: Brian L. Whalen, 8 Hawk Dr., Selden, N.Y. 11784

[21] Appl. No.: 106,435

[22] Filed: Oct. 9, 1987

[51] Int. Cl.⁴ .......................................... F16H 47/04
[52] U.S. Cl. ....................................... 74/682; 74/677; 74/687; 74/674; 74/740
[58] Field of Search ............... 74/677, 682, 756, 740, 74/687, 695, 664, 674, 713, 770

[56] References Cited

U.S. PATENT DOCUMENTS

| | | | |
|---|---|---|---|
| 2,235,420 | 3/1941 | Cory | 74/756 X |
| 2,355,306 | 8/1944 | Koevort | 74/740 |
| 2,584,799 | 2/1952 | Green | 74/756 |
| 2,833,160 | 5/1958 | Morgan | 74/687 |
| 2,929,269 | 3/1960 | Woydt | 74/677 X |
| 2,950,634 | 8/1960 | Clark et al. | 74/682 X |
| 3,090,253 | 5/1963 | Linsley et al. | 74/687 |
| 3,318,172 | 5/1967 | Cummins | 74/682 |
| 3,534,631 | 10/1970 | Keller | 74/687 |
| 4,327,604 | 5/1982 | Evans | 74/682 X |
| 4,637,275 | 1/1987 | Whalen | 74/687 |
| 4,690,016 | 9/1987 | Whalen | 74/687 |

Primary Examiner—Leslie A. Braun
Assistant Examiner—William Gehris
Attorney, Agent, or Firm—Leonard Belkin

[57] ABSTRACT

A torque feedback multistate transmission employing an adjustable differential transmission with one or more planetary gear systems for providing improved efficiency under stationary load conditions and infinitely variable output during each state of the transmission. In one embodiment there is provided a pair of planetary gear systems, a reversing mechanism, a first transmission to establish the state, and a second transmission to provide continuous power flow during shifting of the first transmission. A differential transmission provides continuous variable output during each state of the multistate transmission.

3 Claims, 4 Drawing Sheets

| | 304 | 308 | 402 | 132 | 18 | 82 | 142 | 94 |
|---|---|---|---|---|---|---|---|---|
| S1 | ON | OFF | OFF | OFF | OFF | ON | -1 | |
| S1* | ON | OFF | ON | OFF | ON | | | 1 |
| S2 | ON | OFF | OFF | OFF | ON | OFF | 1/2 | |
| S2* | ON | ON | OFF | ON | ON | OFF | N | N |
| S3 | OFF | ON | OFF | ON | ON | OFF | N | N |
| S3* | OFF | ON | ON | ON | ON | OFF | N | 1 |

| STATE | FWC 826 | CLUTCH 830 | CLUTCH 834 | CLUTCH 836 | RANGE Wo/Wi |
|---|---|---|---|---|---|
| S1 | LOCKED | OFF | OFF | ON | 0-2/9 |
| S1* | LOCKED | OFF | ON | ON | 2/9 |
| S2 | LOCKED | OFF | ON | OFF | 2/9-1/3 |
| S3 | F.W. | ON | ON | OFF | 2/9-5/9 |
| S3* | F.W. | ON | ON | ON | 5/9 |
| S4 | F.W. | ON | OFF | ON | 5/9-1 |

MULTISTATE DIFFERENTIAL TRANSMISSION

BACKGROUND OF THE INVENTION

This invention relates to a torque feedback transmission and more particularly to a torque feedback transmission with direct couple bypass utilizing operational clutches.

In my patent application entitled "Torque Feedback Transmission" having Ser. No. 649,691 filed on Sept. 12, 1984, now U.S. Pat. No. 4,637,275, there is disclosed and claimed a torque feedback transmission capable of providing perfect coupling between input and output torque and speed without the need for clutching and shifting mechanisms.

In some systems, the output of the hydrostatic transmission is connected either directly, or by fixed gear ratio transmission, to the output shaft. In such a design the rotor of the motor is stationary when the output shaft is stationary. In order to apply a load to the output shaft, sufficient force must exist to overcome the static friction of both the hydraulic motor and the load. In addition, some types of pumps operate inefficiently when they bear a stationary load. In the torque feedback design covered in my aforementioned application, the hydraulic transmission bears only the static friction of the load.

Also, some types of differential units, such as differential cones, can only provide infinite variation over some fixed gear ratio and cannot be directly coupled to a stationary load, whereas, by use of the torque feedback design in my above mentioned application it is possible to couple such devices to a stationary shaft without the use of a clutch, and furthermore, for each state or set of gear ratios, the differential unit may be designed to experience its full range of motion thus resulting in a maximum torque reduction.

In the aforementioned application, a variety of embodiments are disclosed in which a differential unit comprising a fixed displacement hydraulic pump and a variable displacement hydraulic motor are coupled to adjust the torque feedback and accomplish the purposes of the invention. Several of the embodiments disclosed in the application provide for a partial bypass of the differential unit in order to reduce fluid pressures in the pump. Such pressures are of special concern at low speeds and under starting conditions.

In one embodiment of the aforementioned application, there is disclosed a torque splitting arrangement wherein the differential unit is bypassed in such a way that there is a direct coupling from the input to the load of a portion of the torque supplied. In that arrangement, it can be seen that when a stationary load exists at the output shaft all power must flow through the hydrostatic or differential unit, with the accompanying high fluid pressures in the unit and in many cases, depending on the type of pump employed, reduced efficiency.

SUMMARY OF THE INVENTION

In the present invention, the drawback of the torque splitting arrangement described above is overcome by a torque feedback transmission in which some of the power is delivered directly to the output shaft and is provided with operational clutches to reduce the torque which appears at the differential unit throughout its entire range of operation. In addition, it is not a necessary part of this torque reduction that the input to the hydrostatic unit rotate at a higher speed than the input shaft. Furthermore, for each state or set of gear ratios, the differential unit experiences its full range of motion thus resulting in a maximum torque reduction.

It is thus an object of this invention to provide a multistate differential transmission with reduced loading on the differential unit.

Other objects and advantages of this invention will hereinafter be obvious from the following description of preferred embodiments of this invention.

DESCRIPTION OF THE PREFERRED EMBODIMENTS

Figure 1:
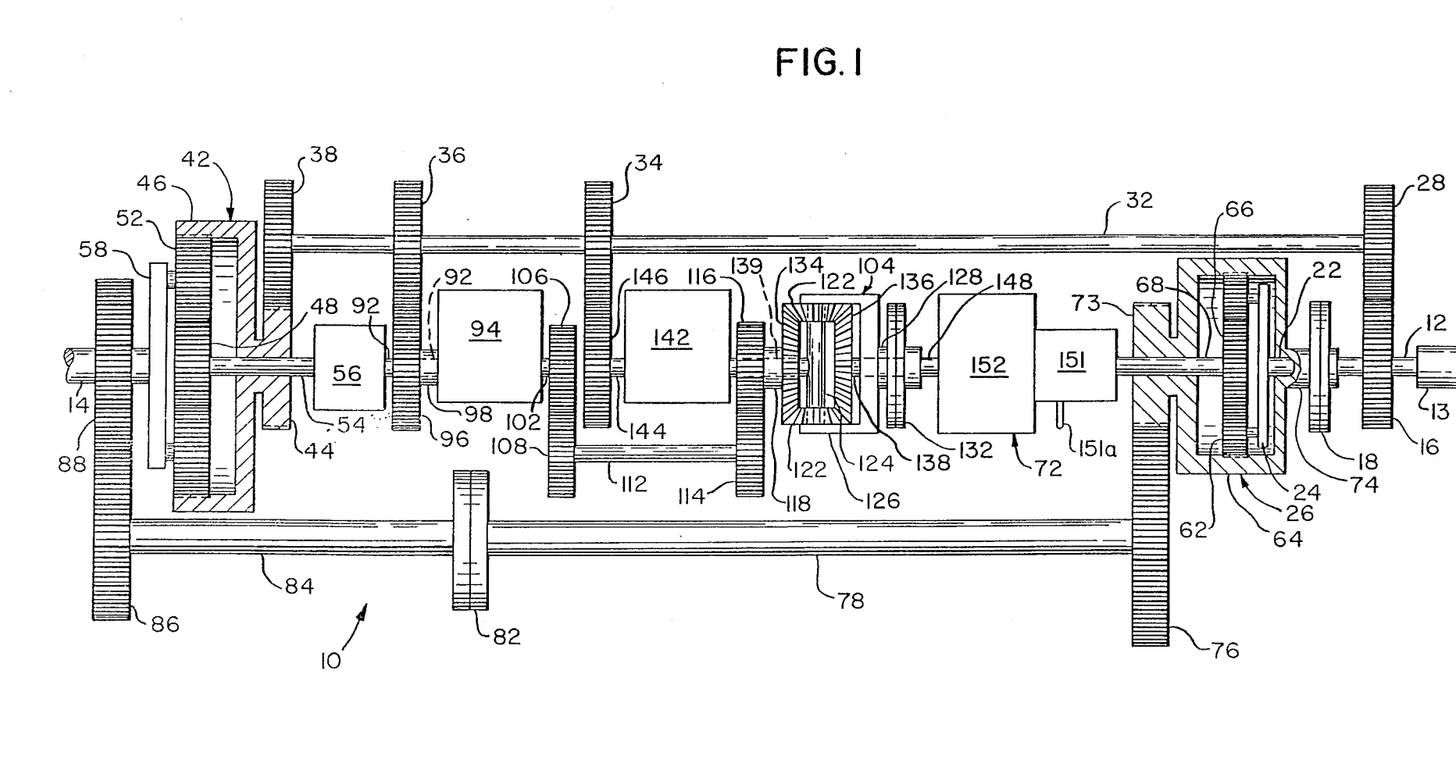
FIG. 1 illustrates in partially schematic form a three state transmission incorporating the principles of this invention.

Referring to FIG. 1, transmission 10 is a three state or speed machine which has an input shaft 12 connected to a prime mover 13 and an output shaft 14 connected to a load (not shown).

Input shaft 12 is keyed to a pinion 16 and also connected to the right side of operational clutch 18. Connected also to the right side of clutch 18 is a shaft 22 which is connected to planetary gear carrier 24 in planetary gear train 26. Thus, depending on the transmission ratio as will be later described, input power to transmission 10 is split between pinion 16 and carrier 24 in planetary gear train 26.

Pinion 16 is engaged with a gear 28 mounted on and keyed to a shaft 32 on which is mounted and keyed gears 34, 36, and 38. Some of the input power transferred by pinion 16 flows into a planetary gear train 42 by way of gear 38 engaged with gear 44 which is connected to ring gear 46 of train 42. The torque applied to ring gear 46 causes a reaction torque to appear at sun gear 48 through planetary gears 52. A shaft 54 joins sun gear 48 to a clutchable, reversing mechanism 56. The output of transmission 10 is delivered by planetary gear carrier 58 supporting planetary gears 52 to output shaft 14.

The direction of flow of power by way of shaft 54 depends on the direction of rotation of sun gear 48. When sun gear 48 rotates in the opposite direction to that of ring gear 46, which would be the case when output shaft 14 is stationary, then sun gear 48 drives shaft 54. When sun gear 48 rotates in the same direction as ring gear 46, then shaft 54 will be driving sun gear 48.

The reason for this reversal of power flow is that the torque arising from sun gear 48 in reaction to the torque applied to ring gear 46 is in the same direction as the latter torque, independent of the direction of rotation of sun gear 48. Since power is equal to the product of torque and rotational velocity, and since only the direction of rotational velocity changes, then the flow of power reverses around the point of zero velocity for sun gear 48. The purpose of reversing mechanism 56 and its internal structure will be described later.

Planetary gear train 26 is a torque splitting unit consisting of planetary gear carrier 24 supporting planetary gears 62 which are engaged with ring gear 64 and sun gear 66, the latter being connected to a shaft 68 for transferring its torque into differential unit 72. When clutch 18 is disengaged, ring gear 64 rotates free of shafts 12 and 22. The details of differential unit 72 will be described later.

Ring gear 64 is connected on one side to a gear 73 and on the other side to the left side of clutch 18 by way of a hollow shaft 74. Ring gear 64 is also joined to output shaft 14 by way of gears 73, 76, a shaft 78 connected to the right side of clutch 82, a shaft 84 connected to the left side of clutch 82, and a gear 86 engaged with gear 88 mounted on and keyed to output shaft 14.

When clutch 82 is engaged, and clutch 18 disengaged, input power is split so that some of it is delivered directly to output shaft 14. The speed of ring gear 64 will be directly proportional to output shaft 14 due to the direct mechanical connection. The gear ratio supplied by gears 88, 86, 76, and 73 determines at what fraction of the input speed of shaft 12 will sun gear 66 and ring gear 64 be rotating at the same speed.

Figure 2:
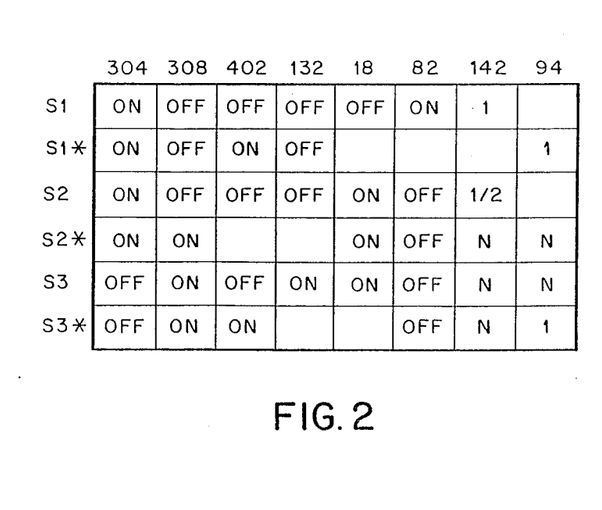
FIG. 2 is a clutch engagement diagram for the transmission of FIG. 1.

When clutch 82 is disengaged and clutch 18 is engaged, power is no longer being split by planetary gear train 26 whose various parts are now coupled together. As is seen in FIG. 2, clutches 18 and 82 are normally in opposite states of engagement.

Referring to planetary gear train 42, it was noted that sun gear 48 is connected by way of shaft 54 to reversing mechanism 56. Reversing mechanism 56 is connected by way of shaft 92 to transmission 94.

The purpose of reversing mechanism 56 is as follows: When shaft 54 rotates in the opposite direction to that of input shaft 12, mechanism 56 causes this direction to be reversed so that shaft 92 rotates in a direction opposite to that of shaft 54. When shaft 54 rotates in the same direction as shaft 12, mechanism 56 does not reverse the direction of shaft 92 with respect to shaft 54, and hence shafts 54 and 92 rotate in the same direction, but not necessarily at the same speed. Thus, mechanism 56 either causes shafts 54 and 92 to rotate together in the same direction or in opposite directions. As will be seen from the discussion below, reversing mechanism 56 reverses in states one and two, and locks up shafts 54 and 92 in the same direction of rotation in state three.

From shaft 32, gear 36 drives a gear 96 which is connected to transmission 94 through a hollow shaft 98 so that transmission 94 receives power from both shafts 92 and 98.

The purpose of transmission 94 is to provide for a clutchable coupling between shafts 92 and 98. Power flows straight through transmission 94 as shaft 92 is always coupled to the former's output shaft 102; however, the speed ratio between shafts 92 and 102 may be altered depending on the speed ratio within transmission 94 as will be later described. Transmission 94 permits power flow through transmission 10 while the latter is in the process of shifting from one state to another by virtue of coupling shafts 92 and 98 together during shifting as will be seen from the discussion below. The shifting periods are indicated by asterisks (*) in FIG. 2.

The torque on shaft 102 is transferred to power return unit 104 by way of spur gears 106 and 108, shaft 112, and spur gears 114 and 116 through a hollow shaft 118.

The purpose of power return unit 104, about to be described, except during lockup of transmission 10 to be later described, is to change the speed of sun gear 48 in planetary gear train 42 so as to change the speed of output shaft 14 over a specific range during each state of transmission 10.

Power return unit 104 consists of a planetary gear train here shown as a pair of bevel gears 122 mounted for independent rotation on the ends of a carrier shaft 124 which is supported by carrier 126, the latter being connected by way of a hollow shaft 128 to the left side of an operational clutch 132.

Engaged with bevel gears 122 are a bevel gear 134 connected to hollow shaft 118 and a bevel gear 136 connected to a shaft 138 which is joined to the right side of operational clutch 132. A shaft 139 rotating inside of hollow shaft 118 is pinned at one end to and driven by carrier shaft 124 and provides at its other end input to a transmission 142. The output of the latter is delivered by way of a shaft 144 to shaft 32 by way of a spur gear 146 engaged with gear 34. Transmission 142 is a multispeed speed transmission which provides positive coupling between shaft 32 and carrier shaft 124 of power return unit 104. The purpose of transmission 142 is to establish the three states or speed ranges of transmission 10.

A shaft 148 delivers the output of differential unit 72 to the right side of operational clutch 132 and thus is directly coupled at all times to shaft 138 which is connected to bevel gear 136 in power return unit 104.

It is thus seen that bevel gear 134 is tied directly to output shaft 102 of transmission 94, and bevel gear 136 is tied directly to the output of differential unit 72.

Differential unit 72 in this embodiment consists of a hydrostatic unit which contains a variable displacement hydraulic pump 151 coupled hydraulically to a fixed displacement hydraulic motor 152. The displacement volume of pump 151 is controlled by a control member 151a. Motor 152 is connected to shaft 148 delivering the output of unit 72, while the rotor of pump 151 is connected to shaft 68 which supplies the input to the former. Adjustment of control member 151a alters the output speed and torque of the transmission 10 over the range of the latter in the state in which it is operating. The construction, operation and control of unit 72 is well known in the art and further description herein of its details of construction is not necessary for an understanding of this invention. Its function in transmission 10 will be more particularly described further below.

As noted above, transmission 10 is a three speed device and a more complete understanding of its operation can be understood by referring to FIG. 2 in connection with the discussion of FIG. 1.

The operation of transmission 10 is described with input shaft 12 connected to prime mover 13 which is operating at a constant rotational speed so that the speed of shaft 12 is constant.

With output shaft 14 stationary, that is, the load not being moved, and transmission 10 in state one, sun gear 48 will rotate at a speed greater than ring gear 46 driving shaft 54, and its direction of rotation will be opposite to that of input shaft 12. Transmission 94 is initially in a disengaged state, that is, shafts 92 and 98 are decoupled which allows power to flow (and torque to be transferred) from shaft 92 to shaft 102 and bevel gear 134 in power return unit 104. The speeds of shafts 92 and 102 are equal. The torque on gear 134 causes a reaction torque to appear at bevel gear 136 equal to the torque applied to gear 134. (They are equal only because both gears are the same size.) The reaction torque which appears at gear 136 is countered by the torque supplied by differential unit 72 via shafts 138 and 148. In this state, clutch 132 is disengaged so that carrier 126 in unit 104, attached to shaft 124, is not coupled to shafts 138 and 148, and gear 136 is stationary.

For power return unit 104 constructed as shown, the equations of motion are: $W_1 = \frac{1}{2}(W_2 + W_3)$ where $W_1$ equals the speed of carrier shaft 124, $W_2$ equals the speed of gear 134, and $W_3$ equals the speed of gear 136. Therefore, with $W_3$ equal to zero, $W_1$ equals $\frac{1}{2}W_2$.

Transmission 10 is now brought out of neutral by adjusting control member 151a in differential unit 72 to increase the displacement of pump 151 so that gear 136 starts to rotate in the same direction as gear 134 and carrier shaft 124. The speed of carrier shaft 124 is fixed by the gear ratio within transmission 142 due to direct coupling to shaft 32. As the speed of gear 136 increases, the speed of gear 134 decreases where $W_2 = 2W_1 - W_3$ (initially $W_2 = 2W_1$). This results in a reduction in speed of sun gear 48 and shaft 14 starts to move the load. Control lever 151a is moved until $W_3$ and the speed of shaft 14 reach some maximum value in state one of transmission 10. If the initial speed of gear 134 is much greater than the maximum value of gear 136 obtained from differential unit 72 this process is repeated until the final speed of gear 134 equals zero.

In order for gear 136 to be returned to zero speed (thus to permit increase in the speed of output shaft 14), transmission 142 must shift, to cause shaft 124 to rotate at a new speed. While transmission 142 is shifting, however, transmission 94 is first actuated to cause shafts 92 and 98 to be coupled together. During this transition coupling period all power flows directly from shaft 32 to output shaft 14 by way of planetary gear train 42. Power return unit 104 during this transition period is completely bypassed allowing for the shifting of transmission 142. It should be noted that transmission 94 allows shafts 92 and 102 to be coupled to shaft 32 at different speed ratios depending on whether transmission 10 is going from state one to state two, or state two to state three, thus allowing for continuous power transfer as the machine goes from one state to the next. As previously noted, the use of an asterisk (*) in FIG. 2 designates the transition periods just described. Blank spaces indicate a "do not care" status. Details of the construction and operation of transmissions 94 and 142 will be given later.

To illustrate more clearly the operation described above, consider the following situation: Suppose sun gear 48 is one half the radius of ring gear 46. When output shaft 14 is stationary, gear 48 rotates at twice the speed of ring gear 46 and in the opposite direction. Reversing mechanism 56 causes the direction of motion of shaft 54 to be reversed resulting in shaft 92 to rotate in the opposite direction of shaft 54 but in the same direction as ring gear 46. With $W_4$ equal to the speed of gear 46 and $W_5$ equal the speed of sun gear 48, then as stated above, $W_4 = -\frac{1}{2}W_5$ and also the speed of shaft 92 equals $2W_4$ or $-W_5$. Transmission 94 has shafts 32 and 92 decoupled and shafts 92 and 102 rotating together. Gear 134 then rotates at speed $2W_4$. Note that $W_4$ also equals the speed of input shaft 12 and $-W_4$ the speed of shaft 32.

Initially gear 136 is at rest and so carrier shaft 124 rotates at speed $W_4$ and is coupled to shaft 32 via transmission 142 at 1:1 ratio. Unit 72 is now operated by moving control member 151a so that gear 136 increases in speed. The speed of carrier shaft 124 is fixed because of its mechanical coupling via transmission 142. Therefore, as gear 136 increases in speed, gear 134 decreases and so does sun gear 48, resulting in movement of output shaft 14 and its increase in speed.

When gear 136 reaches speed $W_4$ then gear 134 has declined in speed also to $W_4$. At this point gear 48 rotates at $-W_4$. Because gear 48 is $\frac{1}{2}$ the radius of gear 46 in this embodiment, the equation of motion for planetary unit 42 is $W0 = \frac{2}{3}W_4 + \frac{1}{3}W_5$ where W0 is the speed of output shaft 14. $W_5$ equals $-W_4$ so, $W0 = \frac{1}{3}W_4$ or $\frac{1}{3}$ the input speed.

To further increase the speed of output shaft 14, transmission 10 must now pass from its first state just described to its second state. This is initially accomplished as already noted by first causing transmission 94 to couple shafts 32 and 92, that is, to become engaged and to move transmission 142 into neutral so that shafts 124 and 32 are decoupled from each other. During this momentary period of engagement of transmission 94, shaft 92 rotates at the same speed as shaft 32 so the coupling is one to one. While transmission 94 is so engaged, all the power flowing through transmission 10 passes by way of transmission 94 to output shaft 14, hence, the load is removed from transmission 142 and unit 72.

To move transmission 10 into state two, with transmission 94 momentarily engaged to couple shafts 92 and 98, and transmission 142 momentarily disengaged to decouple carrier shaft 124 from shaft 132, as described above, control member 151a in differential unit 72 is returned to its initial position (i.e., minimum displacement within the hydraulic pump). Transmission 142 is moved into its next speed so that the speed of rotation of carrier shaft 124 is reduced by half.

Transmission 94 is then disengaged and transmission 142 is engaged, with the result that carrier shaft 124 now rotates at a new speed which, for the example given above, equals $\frac{1}{2}W_4$, in other words one half the speed during state one with control member 151a in its initial position.

The situation is repeated with unit 72 causing gear 136 to increase in speed until it equals $W_4$. Since carrier shaft 124 rotates at $\frac{1}{2}W_4$, this will force gear 134 to come to rest. In addition, sun gear 48 will also be at rest. In order to move into state three of transmission 10, transmission 94 is momentarily engaged holding sun gear 48 stationary while transmission 142 and unit 72 move to the next or third state. Transmission 142 is moved to neutral but this time clutch 132 is now engaged causing carrier shaft 124, gear 136 and gear 134 to rotate as a single unit. In addition, reversing mechanism 56 is now moved to a state where shafts 54 and 92 rotate together. Thus, in the third state of transmission 10, both transmission 94 and 142 are disengaged and unit 72 is effectively coupled directly to sun gear 48.

As the speed of shaft 148, the output of unit 72, increases, so does the speed of sun gear 48 until it reaches $W_4$ and then the output shaft 14 will rotate at the speed of input shaft 12. At this point, with transmission 10 in its third state and output shaft 14 running at the same speed as input shaft 12, a lockup condition can be produced by actuating transmission 94 to engage shafts 92 and 98 thereby coupling shaft 32 directly to shaft 102.

Figure 3:
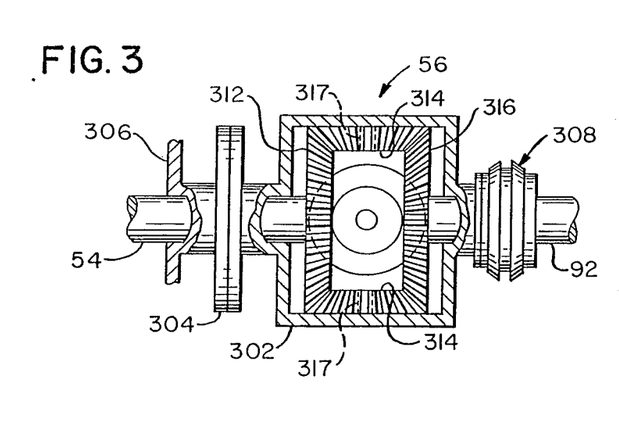
FIG. 3 is a section and partially schematic view of the reversing mechanism shown in FIG. 1.

As seen in FIG. 3, reversing mechanism 56 consists of a carrier 302 connected on one side by way of an operational or free wheeling clutch 304 to stationary housing 306 of transmission 10. The other side of carrier 302 is connected to a sliding dog or any type of an operational clutch 308 which can be locked to output shaft 92. Input shaft 54 is connected to bevel gear 312 joined by planetary gears 314 to bevel gear 316 connected to output shaft 92. Planetary gears 314 rotate on shafts 317 attached to carrier 302.

When clutch 304 is disengaged and clutch 308 engaged then shafts 54 and 92 are locked together and rotate at the same speed. When clutch 304 is engaged and sliding dog clutch 308 is disengaged then shaft 92 rotates in the opposite direction to that of shaft 54. If both clutches are engaged then shafts 54 and 92 will be stationary. Because reversing mechanism 54 in this embodiment has sun and ring gears of equal radii, the equation of motion is $W_c = \frac{1}{2} W_r + \frac{1}{2} W_s$ where $W_s$ is the speed of gear 312, $W_r$ is the speed of gear 316, and $W_c$ equals the speed of carrier 302. If carrier 302 is held stationary, then $0 = \frac{1}{2} W_r + \frac{1}{2} W_s$ or $W_s = -W_r$. If $W_c$ is then locked to either $W_r$ or $W_s$ then $W_s = \frac{1}{2} W_r + \frac{1}{2} W_s$, or $W_r = W_s$. As previously noted, and as seen in FIG. 2, reversal takes place in the first two states of transmission 10 and lockup in the same direction in the third state.

Figure 4:
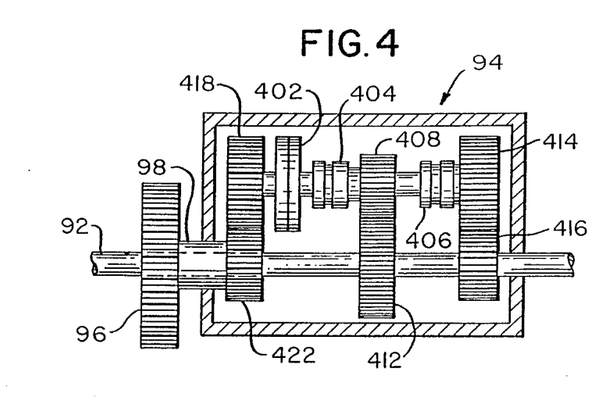
FIG. 4 is a section and partially schematic view of transmission 94 shown in FIG. 1.

For details of transmission 94, reference is made to FIG. 4. Transmission 94 contains a clutch 402 which couples shaft 92 to hollow shaft 98 and gear 96 when engaged. The ratio of this coupling is determined by sliding clutches 404 and 406 and gears 408 and 412, 414 and 416, and 418 and 422. Gear 96 is connected to gear 422 by way of hollow shaft 98. Transmission 94 is of conventional design and its construction and operation are well known in the art. Also, transmission 94 can be of the type described or may be designed to supply more gear ratios or less depending on the requirements of transmission 10.

Figure 5:
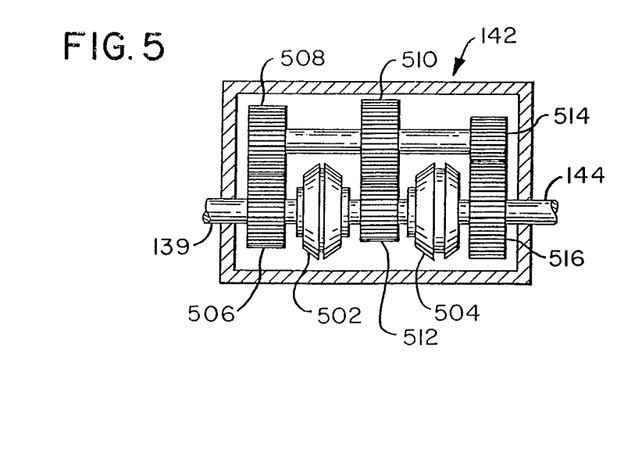
FIG. 5 is a section and partially schematic view of transmission 142 shown in FIG. 2.

Transmission 142 may be a conventional sliding clutch controlled three speed transmission as illustrated in FIG. 5. Briefly described, it is provided with its input shaft 139 and output shaft 144 with sliding clutches 502 and 504 to provide for three gear ratios as a result of the way gears 506, 508, 510, 512, 514, and 516 are joined to each other as illustrated.

By way of example, suppose differential unit 72 has a range of motion from 0 to $W_i$, the input speed of shaft 68. To avoid increasing the complexity of the problem, assume shaft 68 directly connected to shaft 22 and input shaft 12. For a three state machine, as illustrated in FIG. 1, the radius of ring gear 46 in planetary gear system 42 is twice that of sun gear 48. Therefore, the equations of motion for planetary gear train 42 is $W_c = \frac{2}{3} W_r + \frac{1}{3} W_s$ where $W_c$ is the speed of carrier 58 (it is also the output speed of transmission 10), $W_r$ the speed of ring gear 46 and $W_s$ the speed of sun gear 58. For this example, $W_r = W_i$, or $W_r$ equals the input speed. The transmission is initially in state one. When $W_c = 0$, then $W_s = -2W_r$. In state one, reversing mechanism 56 causes shafts 54 and 92 to rotate in opposite directions. Since shaft 54 is connected to sun gear 48, the initial speed of shaft 92 will be $2W_r$ or $2W_i$. As previously described, this speed is imparted to bevel gear 134 of power return unit 104. Initially, bevel gear 136 is at rest. As previously noted, the equation of motion for unit 104 is $W_1 = \frac{1}{2} W_2 + \frac{1}{2} W_3$ or $2W_1$. This 1:1 ratio between shaft 32 and carrier 126 is supplied by transmission 142. Control member 151a is moved causing unit 72 to experience its full range of motion. Therefore, at the end of state one, gear 136 rotates a $W_i$. The speed of gear 134 equals $2W_i - W_3$. Since $W_3 = W_i$, the speed of gear 134 equals $W_i$ also. As a result, the speed of sun gear 48 is $-W_i$ (reversing mechanism 56 causes shafts 92 and 54 to rotate in opposite directions). Therefore, $W_c = \frac{2}{3} W_i - \frac{1}{3} W_i$ or $W_c = \frac{1}{3} W_i$ at the end of state one.

It is a feature of this transmission that unit 72 experiences its full range of motion (zero to $W_i$) in each state. Hence, as transmission 10 shifts to state two, transmission 142 shifts so $2W_i = W_2 + W_3$ with $W_3 = 0$ and $W_2 = W_i$. In state two, $W_1 = \frac{1}{2} W_i$. At the end of state two, $W_3$ once again equals $W_i$. Solving for $W_2$, $W_2 = 2(\frac{1}{2} W_i) - W_i$ or $W_2 = 0$. This also means that $W_s = 0$ and therefore $W_c = \frac{2}{3} W_i$ at the end of state two.

In state three, as earlier noted, reversing mechanism 56 is shifted to lock shafts 54 and 92. Clutch 132 is engaged and transmission 142 is shifted to neutral allowing carrier 126 to rotate independently of shaft 32 and shafts 138 and 128 to rotate together. At this point, the output of unit 72 and the speed of sun gear 48 are equal. As sun gear increases from zero to $W_i$, $W_c$ increases speed from $\frac{2}{3} W_i$ to $W_i$.

Reversing mechanism 56 can be any kind of epicyclic gear train, just like unit 46. Different combinations of epicyclic (planetary) gear trains can be used to achieve different load torque reductions for each state.

Figure 6:
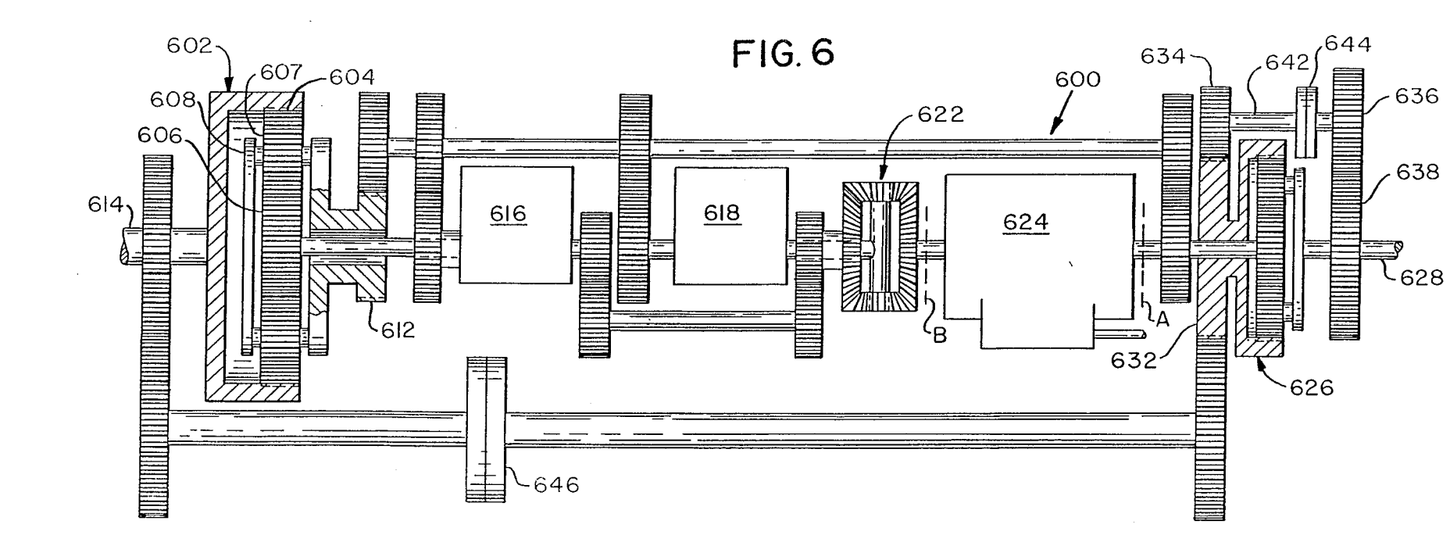
FIG. 6 is a partially schematic view in section of an alternative embodiment of this invention.
Figure 7:
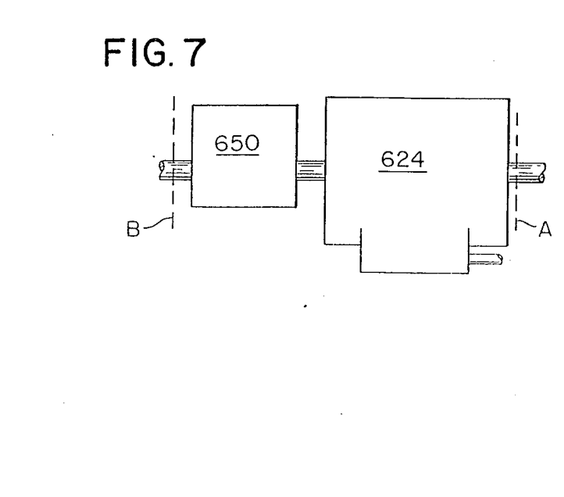
FIG. 7 is a modification of the transmission shown in FIG. 6.

The three state transmission 600 shown in FIG. 6 is similar in design and operation to the transmission described in FIG. 1. The exceptions in construction are as follows: Planetary gear unit 602 consisting of ring gear 604, sun gear 606, planetary gears 607, and planetary carrier 608 has power supplied to it via hub gear 612. Shaft 614 is the output shaft. Ring gear 604 is keyed to shaft 614. In this transmission the need for a reversing mechanism has been eliminated because sun gear 606 initially rotates in the same direction as ring gear 604. The purpose of the three states of this transmission is to cause the speed of sun gear 606 to decline with the result that ring gear 604 will increase in speed. The operation of transmission 616 and 618, power return unit 622, and differential unit 624 are identical to units 94, 142, 104 and 72, respectively, described for the transmission in FIG. 1, with unit 616 engaging while units 618 and 624 shift.

Torque splitting planetary unit 626 receives all the power from input shaft 628. In FIG. 1 only part of the input power flows through planetary unit 26. (Either arrangement may be used in either transmission.) An alternative coupling arrangement is employed for locking up mechanically the torque splitting unit 626. This is accomplished through gears 632, 634, 636, and 638. Gears 636 and 634 are joined by shaft 642 and clutch 644. When clutch 644 is disengaged and clutch 646 engaged, the power supplied at shaft 628 is split. When clutch 644 is engaged and clutch 646 disengaged, no power splitting occurs. This arrangement also suggests the possibility of adding a transmission 650 along with differential unit 624 as shown in FIG. 6a between break lines A and B. The purpose of this would be to allow for increased loads or reduced levels of power through various states of operations. Without transmission 650 the load torque reduction which appears at differential unit 624 is constant for all states.

Figures 8, 8A:
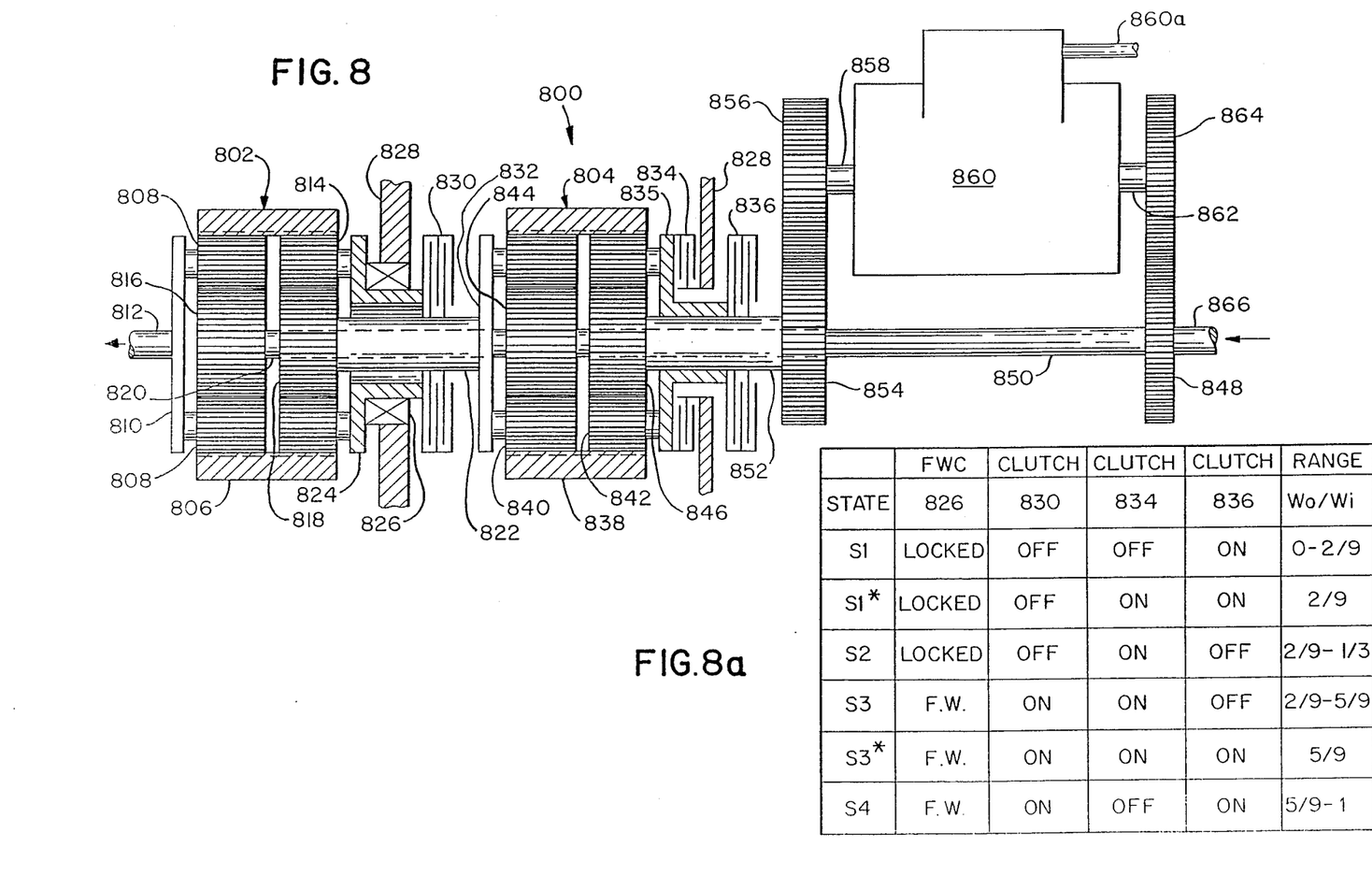
FIG. 8 shows another embodiment of a multistate transmission using two reversing mechanisms.
FIG. 8a is the clutch engagement diagram for the transmission shown in FIG. 8.

FIG. 8 illustrates an embodiment of a multistate device using two reversing mechanisms which is easier to design in a colinear configuration. The device illustrated is a four state machine 800 comprising a pair of units 802 and 804 for load torque reduction. Unit 802 comprises a common ring gear 806 shared between a torque reducing planetary gear train consisting of planetary gears 808 connected by way of carrier 810 to output shaft 812 and a reversing planetary gear train having planetary gears 814. Sun gears 816 and 818 are connected respectively to shaft 820 and hollow shaft 822. Carrier 824 is keyed to free wheeling clutch (FWC) 826. FWC 826 is supported by transmission housing 828. Carrier 824 terminates into one side of operational clutch 830. The other side of operational clutch 830 is keyed to hollow shaft 822. Hollow shaft 822 is also keyed to carrier 832 in planetary gear train 804. It can be seen that the planetary gear train consisting of sun gear 818, ring gear 806, and planetary gears 814 act as a reversing mechanism. When operational clutch 830 is engaged, carrier 824, sun gear 818, and ring gear 806 rotate at the same speed. In addition, the torque appearing on ring gear 806 from the load applied to shaft 812 appears without reduction at hollow shaft 822 as opposed to the reduction which results when clutch 830 is disengaged.

Planetary gear train 804 is identical in construction to unit 802 except that the FWC has been replaced with an operational clutch 834. Operational clutch 834 is connected between transmission housing 828 and planetary carrier 835 which is connected to one side of the second operational clutch 836. The flow of power into or out of unit 804 via carrier 832 and shaft 822 depends on the state of unit 802. Operational clutches 830, 834 and 836 cause transmission 800 to change states. If clutches 830 and 834 are disengaged, a mechanical neutral exists, if all are engaged, the transmission is locked up.

Planetary gear train 804 consists of a common ring gear 838 engaged with two sets of planetary gears 840 and 842, and a pair of sun gears 844 and 846, respectively. Sun gear 844 is joined to sun gear 816 of unit 802 by shaft 820 passing through hollow shaft 822 and to a spur gear 848 by a shaft 850. Sun gear 846 is connected through hollow shaft 852 to a spur gear 854 which is connected through spur gear 856 and to shaft 858 which is the output of differential unit 860 having a control member 860a. The latter unit is identical to differential unit 72 shown in FIG. 1. Input shaft 862 to differential unit 860 is connected by way of spur gears 864 and 848 to shaft 850 and shaft 866 which is the input shaft to transmission 800.

Input to transmission 800 is split, in the fourth or final state of the transmission, between differential unit 860 and sun gears 816 and 844, the latter two sun gears being directly connected to each other. The output of differential unit 860 is connected to sun gear 846 in unit 804. Operation of transmission 800 is described completely in the clutch engagement diagram shown in FIG. 8a.

The device shown in FIG. 8 represents a multistate device using only torque splitting and reversing mechanisms. The design can be made compact because the two planetary gear trains as illustrated can share either a common ring gear or a common sun gear.

It was mentioned earlier that the reversing mechanism can be any kind of epicyclic gear train and that different combinations of such gear trains can be used to obtain different load torque reductions for each state. This is illustrated by the device 900 shown in FIG. 9, consisting of a planetary gear train 902, a reversing mechanism 904, and a differential unit 906, in effect a simpler version of the transmission shown in FIG. 8.

Figure 9:
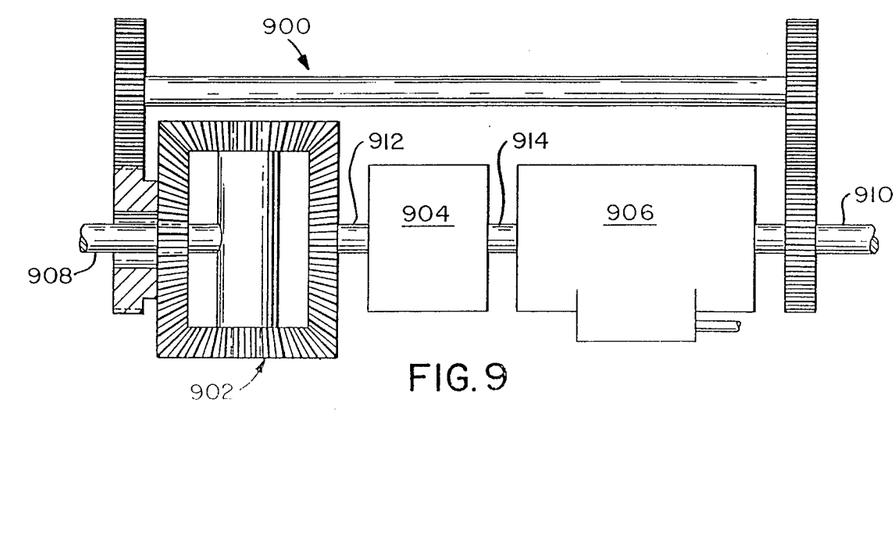
FIG. 9 shows a simpler version of the transmission illustrated in FIG. 8.

Planetary gear train 902, constructed of bevel gears, has an equation of motion: $W_c = \frac{1}{2}W_1 + \frac{1}{2}W_2$ where $W_c$ is the speed of output shaft 908, $W_i$ equals the input speed of shaft 910, $W_1$ and $W_2$ the speed of shaft 906. The device in FIG. 9 is a two state machine. When $W_c$ equals zero, $W_2 = -W_1$ or $W_i$ since $W_1 = W_i$. Reversing mechanism 904 is identical in construction to the device shown in FIG. 3. In state one, reversing unit 904 causes shafts 912 and 914 to rotate in the opposite direction. Initially, shaft 914 equals $W_i$ and throughout state one, shaft 914 rotates at $-W_2$. The speed of shaft 914 declines to zero at the end of state one. At this point, shaft 912 is also stationary and the speed of output shaft 908 is $\frac{1}{2}W_i$. In state two the device in FIG. 9 behaves exactly like transmission 10 (FIG. 1) in state three. Reversing unit 904 changes state at the beginning of state two when $W_2$ still equals zero, locking shafts 912 and 914 together. In state two the output of unit 906, that is, shaft 914, increases in speed from zero to $W_i$ causing $W_2$ to increase in speed from zero to $W_i$ also. When the output of unit 906 equals $W_i$ output shaft 908 equals $W_i$ at the end of state two. Input is at shaft 910.

In the most general case, the reversing mechanism illustrated in FIG. 3 may be constructed with any type of planetary unit. If planetary gear train 902 is changed so that its new equation of motion is $W_c = \frac{1}{3}W_1 + \frac{2}{3}W_2$ ($W_1$ and $W_2$ same as before) then for $W_c = 0$, $W_2 = -\frac{1}{2}W_1$ or $-\frac{1}{2}W_i$. Reversing unit 904 can be changed by using a gear train whose equation of motion is $W_c = \frac{2}{3}W_2 + \frac{1}{3}W_3$ where $W_3$ is the speed of shaft 914 and $W_2$ the speed of shaft 912. In state one $W_c$ is zero and $W_3 = -2W_2$. With shaft 908 stationary, $W_2 = -\frac{1}{2}W_i$ and $W_3 = W_i$. In state one reversing unit 904 provides a reduction in load torque of one half. Gear train 902 provides a load torque reduction of $\frac{2}{3}$. This combined with ($\frac{1}{2}$) for reversing unit 904 the total load torque reduction is ($\frac{1}{2}$)($\frac{2}{3}$) or $\frac{1}{3}$ for state one. In state two the load torque reduction is $\frac{2}{3}$ because the $\frac{1}{2}$ reduction supplied by reversing unit 904 in state one is absent in state two because shafts 912 and 914 are locked together.

In FIG. 6 no reversing mechanism is needed. In the devices described in FIGS. 8 and 9, the power flow through the differential unit will be in both directions. The device in FIG. 1 is a hybrid of the transmission types illustrated in FIGS. 6 and 8 and contains both a reversing mechanism and a power return unit.

While only preferred embodiments of this invention have been described, it is understood that many variations of this invention are possible without departing from the principles of this invention as defined in the claims which follow.

What is claimed is:

1. A multistate transmission having a stationary housing and an input shaft and an output shaft comprising:
   a. a first pair of planetary gear systems having a common ring with a first carrier connected to the output shaft and a second carrier having means limiting the latter to rotation in one direction and connected to one side of an operational clutch;
   b. a second pair of planetary gear systems having a common ring with a first carrier connected to a sun gear in said first system and a second carrier connected to said housing through a second operational clutch and to one side of a third operational clutch, the other side of said third operational clutch being connected to a sun gear in said second system.
c. means for delivering torque from said input shaft to the other sun gears in each of said first and second systems; and
d. adjustable differential transmission means for delivering torque from said input shaft to the other side of said third operational clutch for adjusting the speed of said output shaft during each state of said multistate transmission.

2. A multistate transmission suitable for a colinear configuration having a stationary housing and an input shaft and an output shaft comprising:
 a. a first pair of planetary gear trains comprising a first common ring gear having a torque reducing gear train consisting of a sun gear and planetary gears connected by way of a carrier to said output shaft and a reversing planetary gear train consisting of a sun gear and planetary gears;
 b. a second pair of planetary a trains comprising a second common ring gear having a torque reducing gear train consisting of a sun gear and planetary gears connected by way of a carrier to the sun gear in the reversing planetary gear train in said first pair of planetary gear trains and a reversing planetary gear train consisting of a sun gear and planetary gears;
 c. carrier means connecting the sun gears in said first pair of planetary gear trains to said housing through a free wheeling clutch to provide for rotation in one direction only and to one side of a first operational clutch, the other side of said clutch being connected to the sun gear in the reversing planetary gear train in said first pair of planetary gear trains;
 d. means connecting the planetary gears in the reversing mechanism of said second pair of planetary gear trains to said housing through a second operational clutch and to one side of a third operational clutch, the other side of said third operational clutch being connected to the sun gear in the reversing planetary gear train in said second pair of planetary gear trains;
 e. shaft means for delivering torque from said input shaft to both said sun gears in the gear reducing trains of said first and second pair of planetary gear trains; and
 f. adjustable differential transmission means for delivering torque from said input shaft to the sun gear in the reversing mechanism in said second pair of planetary gear trains for adjusting the speed of said output shaft during each state of said multistate transmission, said first, second and third operational clutches upon selective engagement and disengagement providing for the states of operation of said multistate transmission.

3. A two state transmission with an input shaft and an output shaft comprising:
 a. a planetary gear system having first and second bevel gears joined by a plurality of carrier bevel gears supported on the ends of a carrier shaft, and means connecting the latter to the output shaft of said two state transmission;
 b. means for delivering torque from said input shaft to said first bevel gear;
 c. adjustable differential transmission means receiving its input from said input shaft for adjusting the speed of said output shaft during each state of said two state transmission; and
 d. reversing means connecting the output of said differential transmission means to said second bevel gear means for changing the state of said two state transmission means so that in state one the input to and output from said reversing means are in opposite directions while in state two the input and output of said reversing means are locked together in the same direction.

* * * * *